(12) United States Patent
Lövgren et al.

(10) Patent No.: US 8,621,949 B2
(45) Date of Patent: Jan. 7, 2014

(54) SAFETY DEVICE FOR A LINEAR ACTUATOR AND A LINEAR ACTUATOR

(75) Inventors: Torbjörn Lövgren, Kode (SE); Pontus Claesson, Helingborg (SE); Peter A Hansson, Göteborg (SE)

(73) Assignee: Aktiebolaget SKF, Göteborg (SE)

( * ) Notice: Subject to any disclaimer, the term of this patent is extended or adjusted under 35 U.S.C. 154(b) by 272 days.

(21) Appl. No.: 13/000,714

(22) PCT Filed: Jul. 2, 2009

(86) PCT No.: PCT/SE2009/000347
§ 371 (c)(1),
(2), (4) Date: Dec. 22, 2010

(87) PCT Pub. No.: WO2010/005358
PCT Pub. Date: Jan. 14, 2010

(65) Prior Publication Data
US 2011/0101806 A1    May 5, 2011

(30) Foreign Application Priority Data

Jul. 11, 2008    (SE) ..................................... 0801674

(51) Int. Cl.
*F16H 25/02*    (2006.01)
*F16P 5/00*    (2006.01)

(52) U.S. Cl.
USPC ....................... 74/89.39; 74/89.38; 192/129 R

(58) Field of Classification Search
USPC ........ 74/89.26, 89.37, 89.38; 403/373, 374.2, 403/374.3, 374.4; 192/129 R, 137, 138, 139, 192/141, 143, 150; 240/99.2, 99.3; 244/99.2, 99.3
See application file for complete search history.

(56) References Cited

U.S. PATENT DOCUMENTS

| 1,405,976 | A | * | 2/1922 | Dhooge ...................... 294/86.29 |
| 1,923,132 | A | * | 8/1933 | Witkin ............................. 464/20 |
| 2,039,943 | A | * | 5/1936 | Wickersham et al. ............ 285/3 |
| 2,901,076 | A | * | 8/1959 | Dean ............................. 192/150 |

(Continued)

FOREIGN PATENT DOCUMENTS

GB         2018389 A    10/1979
WO    WO2004065832 A1    8/2004

*Primary Examiner* — Troy Chambers
*Assistant Examiner* — Valentin Craciun
(74) *Attorney, Agent, or Firm* — Bryan Peckjian; SKF USA Inc. Patent Department

(57) ABSTRACT

The invention concerns a safety device (1) for an actuator comprising a connection means (2) allowing a connection to a releasable holding means (5). The connection means (2) is fixed via a sacrificing means (3) to a supporting means (4), and a resilient means (7) is acting between the supporting means (4) and a supporting portion (8). An extension means (9) is fixed to the supporting means (4) via the connection means (2). The sacrificing means (3) has a mechanical strength such that the sacrificing means (3) breaks when subjected to a force exceeding a predetermined force, such that the extension means is no longer fixed to the supporting means and that a re-connection of the supporting means (4) and the releasable holding means (5) is made impossible. The predetermined force is lower than the mechanical strength of the extension means (9) and the supporting means (4). A linear actuator (13) comprising the safety device (1) is also provided.

7 Claims, 4 Drawing Sheets

(56) References Cited

U.S. PATENT DOCUMENTS

| | | | |
|---|---|---|---|
| 4,179,944 A * | 12/1979 | Conner | 74/89.26 |
| 4,318,304 A * | 3/1982 | Lang | 74/89.38 |
| 4,644,811 A * | 2/1987 | Tervo | 74/412 TA |
| 5,315,064 A * | 5/1994 | Andrews | 174/40 TD |
| 5,431,085 A * | 7/1995 | Geffray | 91/44 |
| 5,673,593 A * | 10/1997 | Lafferty | 74/89.38 |
| 6,851,648 B2 * | 2/2005 | Perni et al. | 244/99.3 |
| 7,179,011 B1 * | 2/2007 | Cohen | 403/315 |
| 7,562,594 B2 * | 7/2009 | Nagai et al. | 74/89.23 |
| 7,802,488 B2 * | 9/2010 | Bucheton et al. | 74/89.23 |
| 7,849,756 B2 * | 12/2010 | Minnig et al. | 74/89.26 |
| 8,375,814 B2 * | 2/2013 | Hillen et al. | 74/89.38 |
| 2002/0014944 A1 * | 2/2002 | Dinsmore | 337/157 |
| 2002/0074852 A1 * | 6/2002 | Scrivens et al. | 301/6.5 |
| 2002/0104394 A1 * | 8/2002 | Manzanares et al. | 74/89.26 |
| 2002/0171556 A1 * | 11/2002 | Emaci et al. | 340/686.2 |
| 2003/0145667 A1 * | 8/2003 | Donald et al. | 74/89.26 |
| 2004/0014541 A1 * | 1/2004 | Dal Pra | 474/70 |
| 2004/0206200 A1 * | 10/2004 | Blendea | 74/502.6 |
| 2005/0252318 A1 * | 11/2005 | Corney | 74/89.23 |
| 2005/0266945 A1 * | 12/2005 | Meggiolan | 474/70 |
| 2006/0071128 A1 * | 4/2006 | Cavalli | 246/415 R |
| 2006/0071190 A1 | 4/2006 | Pfister | |
| 2006/0199688 A1 * | 9/2006 | Dal Pra | 474/70 |
| 2008/0190598 A1 * | 8/2008 | Carr et al. | 166/77.51 |

* cited by examiner

SAFETY DEVICE FOR A LINEAR ACTUATOR AND A LINEAR ACTUATOR

FIELD OF THE INVENTION

According to a first aspect, the invention concerns a safety device for a linear actuator.

According to a second aspect, the invention concerns a linear actuator comprising a safety device.

BACKGROUND

Linear actuators are used in many different applications. In most cases, e.g. during normal operation it is wanted to perform these operations in a controlled manner. However, in case of an emergency it may be needed to automatically perform a certain operation of the actuator, even during loss of power. To ensure that, some actuators are equipped with an emergency operation function that often is designed to cause the actuator to automatically go to a specific position. However, in some applications high, and very high, forces and speeds are required. If an actuator in such an application, and which has an emergency operation function, is damaged, subjected to a faulty operation, or if something is blocking the actuation of the actuator, severe human injuries and damages to equipment and buildings may occur if the emergency operation is executed. If, for instance, the dampering is not working properly, the speed and forces will be so high that bursts and cracks may occur. The bursts or cracks may not always be visible. If the actuator then is reset and later performs another emergency operation, parts of the actuator may break and be thrown away due to the high speeds and forces. It is usually not economically or practically feasible to over dimension the actuator. Furthermore, to overdimension an actuator does not solve the problem, since sooner or later, after a few emergency operations with failed dampering, the actuator will most probably not be able to withstand the high forces and speeds anymore, thus increasing the risk of severe damages anyways. To dismount and disassemble the actuator after every emergency operation to visually inspect the condition would be costly and not practical.

Consequently, there is a need for a safety device for an actuator that allows and ensures an emergency operation while reducing the risk of human injuries and property damages.

SUMMARY OF INVENTION

An object of the invention is to provide a safety device for a linear actuator. More specifically, it is an object to provide a safety device that is safe, reliable and reduces the risk of human injuries and property damages.

According to the first aspect of the invention, the object is achieved by a safety device for a linear actuator. The safety device comprises a connection means that allows a connection to a releasable holding means, the movement of which is controlled by a nut and screw arrangement. The connection means is fixed via a sacrificing means to a supporting means. A resilient means acts between the supporting means and a supporting portion that is in fixed relation to the nut and screw arrangement. An extension means is fixed to the supporting means via the connection means. The sacrificing means has a mechanical strength such that the sacrificing means breaks when subjected to a force exceeding a predetermined force. Consequently is a re-connection of the supporting means and the releasable holding means made impossible. When the sacrificing means breaks, the extension means is no longer fixed to the supporting means. The predetermined force is lower than the mechanical strength of the extension means and the supporting means. An advantage of this arrangement is that even though the sacrificing means has broken, the resilient means will still act upon the supporting means, which in turn will act upon the extension means and keep it in a desired position, e.g. holding it in an end state. But, since the sacrificing portion has broken, it is not possible to re-connect the releasable holding means to the supporting means, which means that it is not possible to reset the actuator, i.e. to pull or push the extension means from e.g. the end state, without for instance servicing and replacement of parts. It may still be possible to drive the screw and nut arrangement back and forth, and also to re-connect the releasable holding means to the connection means. This will however not affect the supporting means and the extension means, since these are no longer fixed to the connection means. The advantage of this is by using the safety device according to the invention, it may be ensured that, if the actuator comprising the safety device has been subjected to damaging forces, the sacrificing means will be broken. Consequently, since it is no longer possible to reset the actuator without servicing, there is a reduced risk of human injuries or equipment damages due to actuator parts rapidly thrown away.

In an embodiment, the force is resulting from a collision between the extension means, or the supporting means, and an object within an actuator. In an embodiment, the force is resulting from a collision between the supporting means and a part of the housing, or a part fixed to the housing. This may e.g. occur when a dampering function of the actuator has failed or is disabled. In an embodiment, the force is resulting from a collision between the extension means and a blocking element outside of an actuator.

In an embodiment, the force is resulting from a collision between an object and an element connected or fixed to the extension means. The object may be a broken part. It may also be an end stop to which the actuator is supposed to go to, but if e.g. the dampering has failed, the extension means, or the element connected to the extension means, may hit the end stop at too great speed, which may cause a damaging collision.

According to an aspect of the invention, a linear actuator includes a housing having a support wall, a releasable grip, a nut and screw assembly controlling movement of the releasable grip, and a motor for driving the nut and screw assembly, the motor being fixed to the housing, and a safety device. The safety device includes a connection element configured to be gripped by the grip, a support connected to the connection element and including an elongate member projecting outside the housing, and a spring between the support wall and the support. The support is connected to the connection element at a joint, and the joint is configured to break when subjected to a force exceeding a predetermined force to disconnect the elongate element from the connection element.

In an embodiment, the extension means may be an extension tube or an extension rod.

In an embodiment, the supporting means is any of a plate, a disc, a sleeve, or a cylinder.

In an embodiment, the sacrificing means has a zone of rupture comprising any of an attenuation, a groove, a flange, or a material of lower strength. This may be an easy and cheap solution.

In an embodiment, the sacrificing means is any of a screw, a nail, or a rivet. This may be a cheap and reliable solution.

In an embodiment, the sacrificing means comprises a snap fit mechanism. A snap fit mechanism is a mechanical joint system with locating and locking features that are integrated with one or the other of the components being joined. Joining by snap fit requires a flexible locking feature to move aside for engagement with a mating component. When in the right place, the locking feature returns toward its original position and thus accomplish the interference that is necessary to fasten the components to each other. An advantage with a snap fit mechanism is a fast and facilitated assembly operation.

In an embodiment, the locating part of the snap fit mechanism may be fixed to the connecting means, and the locking part of the snap fit mechanism may be fixed to the supporting means. In another embodiment, a locating part of the snap fit mechanism may be fixed to the supporting means, and a locking part of the snap fit mechanism may be fixed to the supporting means.

In an embodiment, the sacrificing means is glue, which is applied at least partly on the surfaces between the supporting means and the connection means.

In an embodiment, the sacrificing means is a weld seam.

In an embodiment the extension means has a protrusion that extends perpendicularly to a direction of movement of the extension means. If the sacrificing means is broken, the protrusion will limit the movement of the extension means in relation to the supporting means, so that the resilient means acts on the supporting means, and the supporting means acts on the extension means leading to that the extension means is maintained in a desired state.

According to the second aspect of the invention, a linear actuator is provided. The linear actuator comprises the safety device according to the first aspect of the invention. Furthermore, it comprises a housing to which the supporting portion is fixed. In an embodiment, the supporting portion is integral with the housing. The supporting portion may be located at different positions, as understood by a man skilled in the art. The linear actuator further has a releasable holding means, the movement of which is controlled by a nut and screw arrangement, and a motor for driving the nut and screw arrangement. The motor is fixed to the housing.

In an embodiment, the linear actuator further comprises damper means for dampering the movement of the supporting means.

All embodiments and features of the first aspect of the invention are applicable to the second aspect, and vice versa.

DETAILED DESCRIPTION OF PREFERRED EMBODIMENTS

Figure 1:
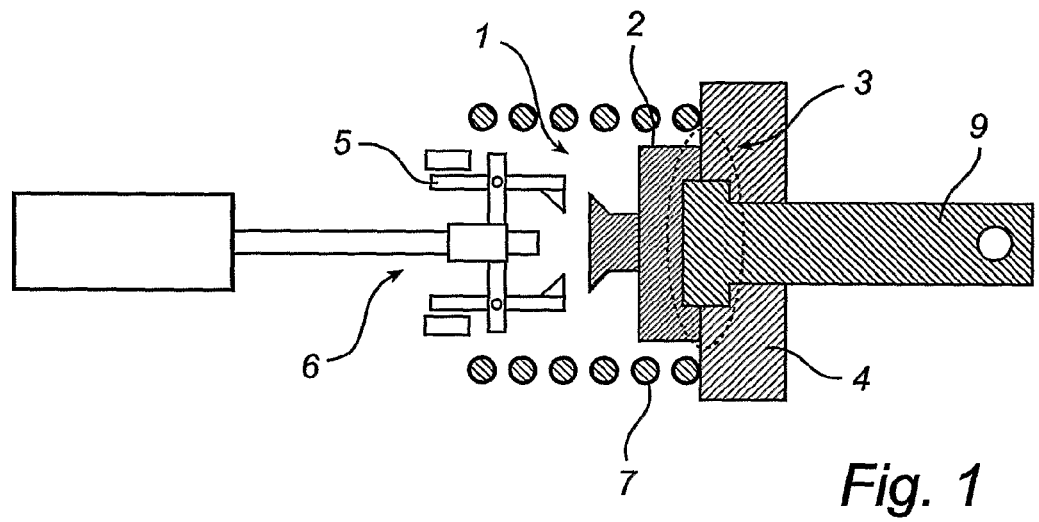
FIG. 1: A schematic view of a safety device for an actuator according to an embodiment of the invention.

In FIG. 1, a schematic view of a safety device for an actuator according to an embodiment of the invention is shown. The safety device 1 for an actuator comprises a connection means 2 that allows a connection to a releasable holding means 5. The movement of the releasable holding means is controlled by a nut and screw arrangement 6. The connection means 2 is fixed via a sacrificing means 3 to a supporting means 4. A resilient means 7 acts between the supporting means 4 and a supporting portion (omitted from FIGS. 1-4 for clarity but illustrated in FIGS. 5-7) that is in fixed relation to the nut and screw arrangement 6. An extension means 9 is fixed to the supporting means 4 via the connection means 2. In this embodiment, the connection means 2 is pressing the extension means 9 against supporting means 4, thus fixing them together. The sacrificing means 3 is designed to have a mechanical strength such that the sacrificing means 3 breaks when subjected to a force exceeding a predetermined force, such that the extension means 9 is no longer fixed to the supporting means 4 and that a re-connection of the supporting means 4 and the releasable holding means 5 is made impossible. The predetermined force is lower than the mechanical strength of the extension means 9 and the supporting means 4.

Figure 2:
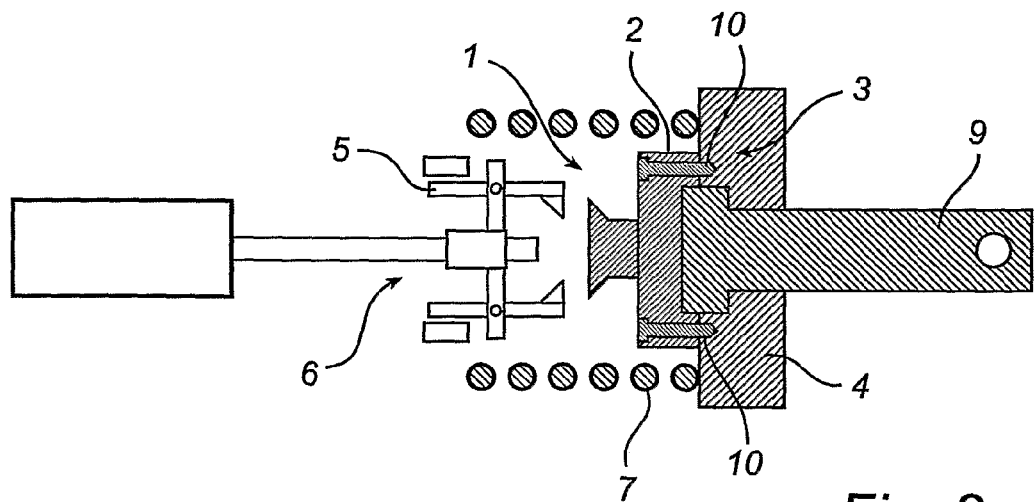
FIG. 2: A schematic view of a safety device for an actuator according to an embodiment of the invention.

In FIG. 2, a schematic view of a safety device for an actuator according to an embodiment of the invention is shown. The safety device 1 for an actuator comprises a connection means 2 that allows a connection to a releasable holding means 5. The movement of the releasable holding means is controlled by a nut and screw arrangement 6. The connection means 2 is fixed via a sacrificing means 3 to a supporting means 4. A resilient means 7 acts between the supporting means 4 and a supporting portion (not shown) that is in fixed relation to the nut and screw arrangement 6. An extension means 9 is fixed to the supporting means 4 via the connection means 2. In this embodiment, the connection means 2 is pressing the extension means 9 against supporting means 4, thus fixing them together. In this embodiment, the sacrificing means 3 is a plurality of screws 10 which have a mechanical strength such that the screws 10 breaks when subjected to a force exceeding a predetermined force, such that the extension means 9 is no longer fixed to the supporting means 4 and that a re-connection of the supporting means 4 and the releasable holding means 5 is made impossible. The predetermined force is lower than the mechanical strength of the extension means 9 and the supporting means 4.

Figure 3:
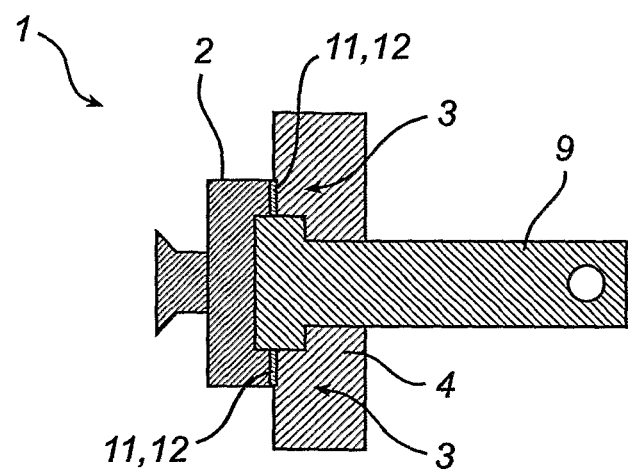
FIG. 3: A schematic view of a safety device for an actuator according to an embodiment of the invention.

In FIG. 3, a schematic view of a safety device for an actuator according to an embodiment of the invention is shown. The safety device 1 for an actuator comprises a connection means 2 that allows a connection to a releasable holding means (not shown). The connection means 2 is fixed via a sacrificing means 3 to a supporting means 4. In this embodiment, the sacrificing means 3 is any of a glue 11 or a weld seam 12. An extension means 9 is fixed to the supporting means 4 via the connection means 2. In this embodiment, the connection means 2 is pressing the extension means 9 against the supporting means 4, thus fixing them together. The sacrificing means 3 has a mechanical strength so that it breaks when subjected to a force exceeding a predetermined force, such that the extension means 9 is no longer fixed to the supporting means 4 and that a re-connection of the supporting means 4 and the releasable holding means (not shown) is made impossible. The predetermined force is lower than the mechanical strength of the extension means 9 and the supporting means 4.

Figure 4:
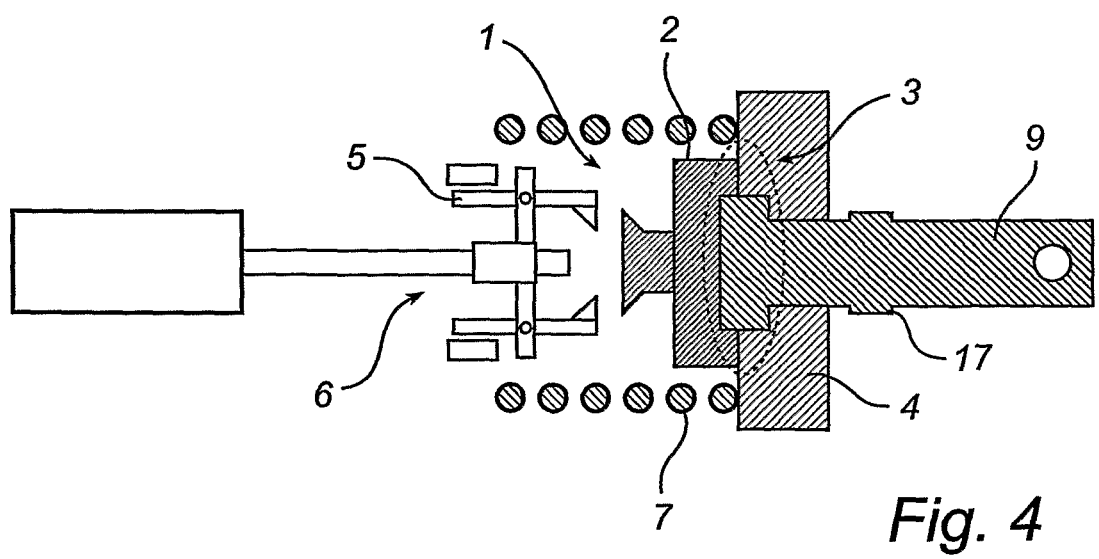
FIG. 4: A schematic view of a safety device for an actuator according to an embodiment of the invention.

In FIG. 4, a schematic view of a safety device for an actuator according to an embodiment of the invention is shown. The safety device 1 for an actuator comprises a connection means 2 that allows a connection to a releasable holding means 5. The movement of the releasable holding means is controlled by a nut and screw arrangement 6. The connection means 2 is fixed via a sacrificing means 3 to a supporting means 4. A resilient means 7 acts between the supporting means 4 and a supporting portion (not shown) that is in fixed relation to the nut and screw arrangement 6. An extension means 9 is fixed to the supporting means 4 via the connection means 2. In this embodiment, the connection means 2 is pressing the extension means 9 against the supporting means 4, thus fixing them together. The sacrificing means 3 is designed to have a mechanical strength such that the sacrificing means 3 breaks when subjected to a force exceeding a predetermined force, such that the extension means 9 is no longer fixed to the supporting means 4 and that a re-connection of the supporting means 4 and the releasable holding means 5 is made impossible. The predetermined force is lower than the mechanical strength of the extension means 9 and the supporting means 4. In this embodiment, the extension means 9 has a protrusion 17 that extends perpendicularly to a direction of movement of the extension means 9. If the sacrificing means 3 is broken, the protrusion 17 will limit the movement of the extension means 9 in relation to the supporting means 4, so that the resilient means 7 acts on the supporting means 4, and the supporting means 4 acts on the extension means 9 leading to that the extension means 9 is maintained in a desired state. The protrusion 17 may be an integral part of the extension means 9, or a pin, a screw, a rivet etc.

Figure 5:
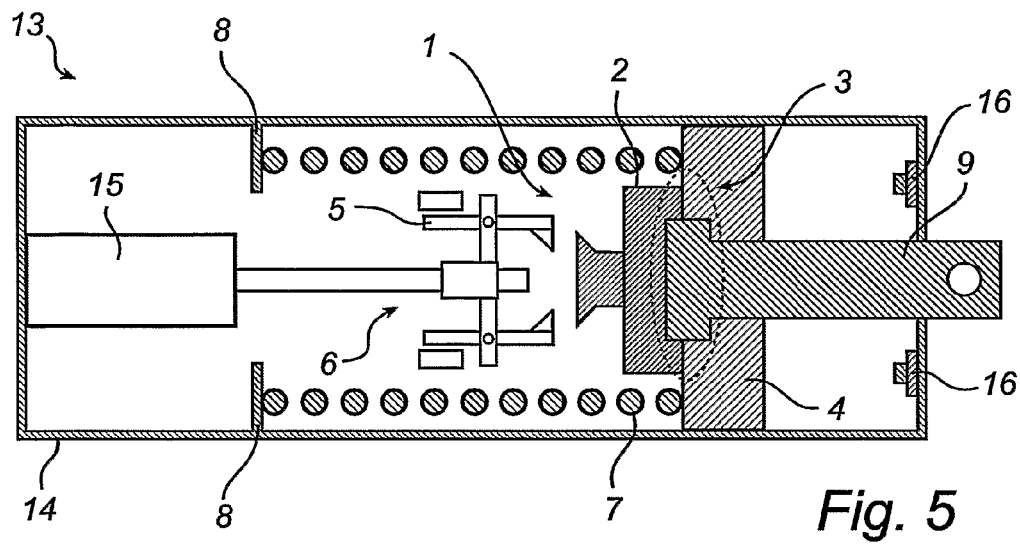
FIG. 5: A schematic view of a linear actuator according to an embodiment of the invention.

In FIG. 5, a schematic view of a linear actuator according to an embodiment of the invention is shown. The linear actuator 13 comprises the safety device 1 according to the first aspect of the invention. Furthermore it comprises a housing 14, a supporting portion 8 that is fixed to the housing 14, and a releasable holding means 5, the movement of which is controlled by a nut and screw arrangement 6. The resilient means 7 acts between the supporting portion 8 and the supporting means 4. The linear actuator 13 also comprises a motor 15 for driving the nut and screw arrangement 6 and the motor 15 is fixed to the housing 14. Damper means 16 for dampering the movement of the supporting means 4 are also provided.

Figure 6:
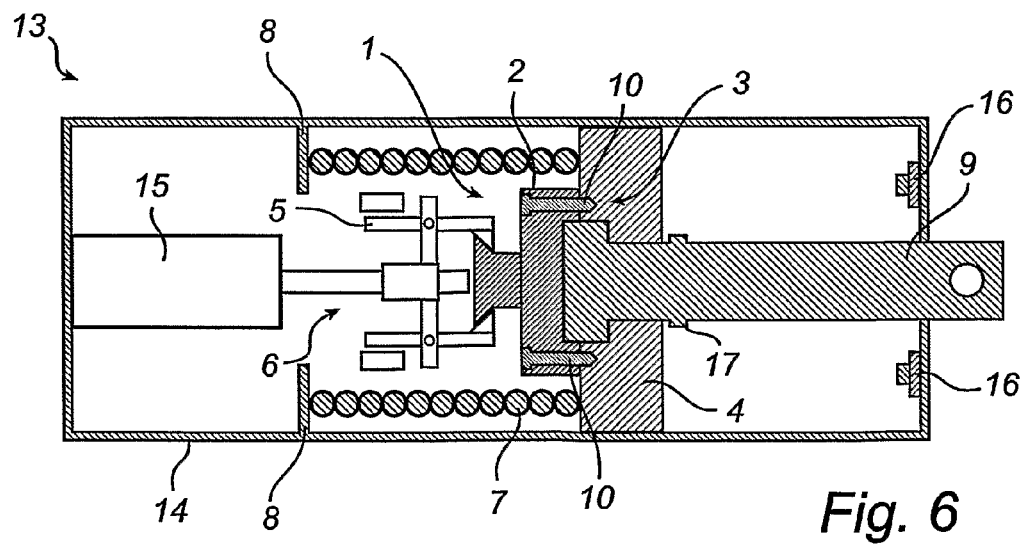
FIG. 6: A schematic view of a linear actuator according to an embodiment of the invention.

In FIG. 6, a schematic view of a linear actuator according to an embodiment of the invention is shown. The linear actuator 13 comprises the safety device 1 according to the first aspect of the invention. Furthermore it comprises a housing 14, a supporting portion 8 that is fixed to the housing 14, and a releasable holding means 5, the movement of which is controlled by a nut and screw arrangement 6. The resilient means 7 acts between the supporting portion 8 and the supporting means 4. The supporting portion 8 may integral with the housing 14. It may also be located at other positions than shown in the figure. The linear actuator 13 also comprises a motor 15 for driving the nut and screw arrangement 6 and the motor 15 is fixed to the housing 14. Damper means 16 for dampering the movement of the supporting means 4 are also provided. In the figure the connection means 2, the extension means 9 and the supporting means 4 are in a first position, with the resilient means 7 in an energized state. According to this embodiment, it is a compressed spring, or a stack of springs. Furthermore, according to this embodiment, the connection means 2 are fixed to the supporting means 4 by a sacrificing means 3 in the form of a plurality of screws 10. The releasable holding means 5 is connected to the connection means 2, maintaining it in the first end position. The extension means 9 further has a protrusion 17 that extends perpendicularly to a direction of movement of the extension means 9.

Figure 7:
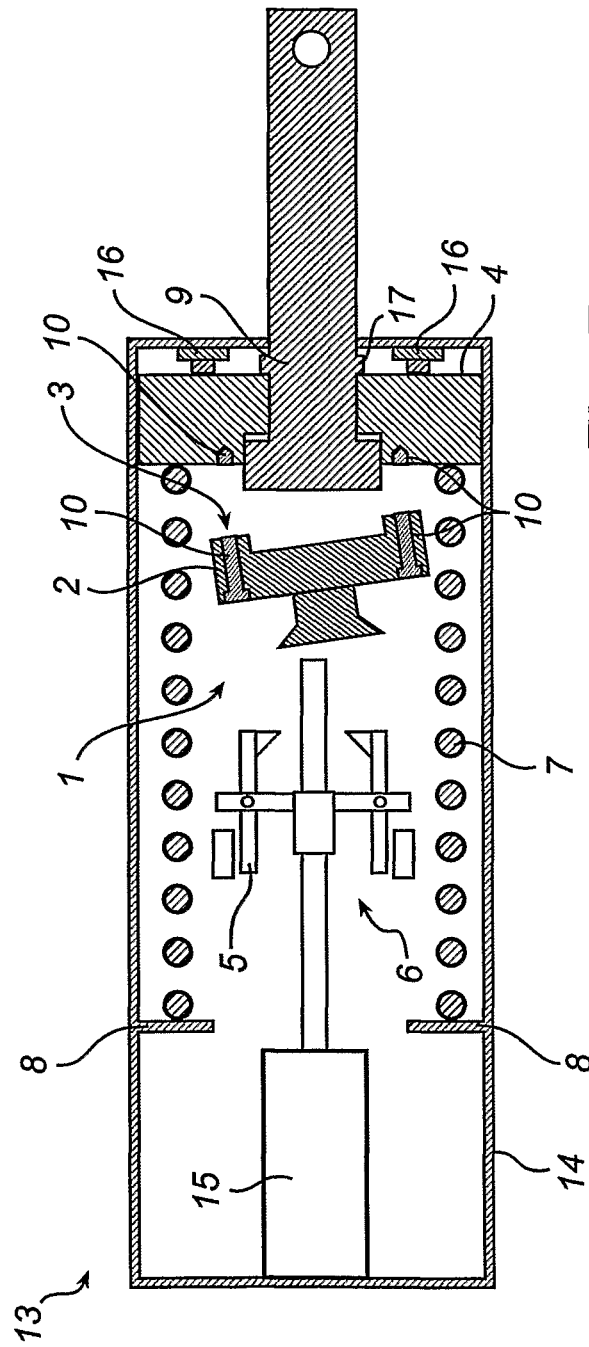
FIG. 7: A schematic view of a linear actuator according to an embodiment of the invention.

In FIG. 7, a schematic view of a linear actuator according to an embodiment of the invention is shown. It comprises the same linear actuator as the embodiment shown in FIG. 6. However, in this embodiment, an emergency release has occurred that automatically released the connection between the releasable holding means 5 and the connection means 2. This caused the resilient means 7 to rapidly push the supporting means 4 towards a second end state. In this embodiment, the extension means 9 collided with an external object (not shown) at a high speed. The collision induced a force that was higher than a predetermined force needed to break the sacrificing means 3, i.e. the screws 10, thus breaking the fixed connection between the connection means 2 and the supporting means 4. However, since the resilient means 7 are acting on the supporting means 4, which in turn acts on the extension means 9 (in this embodiment via the protrusion 17), the extension means 9 is maintained in the second end state, fulfilling the function of the emergency release. In this condition, it is no longer possible to reset the linear actuator, i.e. to drive the release holding means 5 forward and connect to the supporting means 4. It may be possible for the release holding means 5 to connect to the connection means 2, but since the screws 10 of the sacrificing means 3 are broken, it is not possible to connect to the supporting means 4 and pull it and the extension means 9 towards the first end state.

The invention claimed is:

1. A linear actuator comprising:
    a housing having a support wall,
    a releasable grip,
    a nut and screw assembly controlling movement of the releasable grip,
    a motor for driving the nut and screw assembly, the motor being fixed to the housing, and
    a safety device including:
    a connection element configured to be gripped by the grip,
    a support connected to the connection element and including an elongate member projecting outside the housing,
    a spring between the support wall and the support,
    wherein the support is connected to the connection element at a joint, the joint being configured to break when subjected to a force exceeding a predetermined force to disconnect the elongate element from the connection element.

2. The linear actuator according to claim 1, wherein the predetermined force is lower than a mechanical strength of the elongate element and a mechanical strength of the support.

3. The linear actuator according to claim 2, wherein the joint is configured such that, after the elongate element is disconnected from the connection element, the elongate element cannot be reconnected to the connection element.

4. The linear actuator according to claim 1, wherein the joint comprises a screw or a nail or a rivet.

5. The linear actuator according to claim 1, wherein the joint comprises a snap fit mechanism.

6. The linear actuator according to claim 1, wherein the joint comprises glue.

7. The linear actuator according to claim 1, wherein the joint comprises a weld seam.

* * * * *